United States Patent
Vasquez et al.

(10) Patent No.: US 7,250,075 B1
(45) Date of Patent: Jul. 31, 2007

(54) WATER OUTLET CONTROL MECHANISM FOR FUEL CELL SYSTEM OPERATION IN VARIABLE GRAVITY ENVIRONMENTS

(75) Inventors: Arturo Vasquez, Pasadena, TX (US); Kerri L. McCurdy, Pearland, TX (US); Karla F. Bradley, Houston, TX (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 506 days.

(21) Appl. No.: 10/874,004

(22) Filed: Jun. 16, 2004

(51) Int. Cl.
*B01D 19/00* (2006.01)
*B01D 45/12* (2006.01)

(52) U.S. Cl. .......................... 95/241; 95/260; 95/261; 96/108; 96/214; 96/216; 210/767; 210/787; 210/188; 210/512.1; 429/12

(58) Field of Classification Search .................. 429/12; 210/787, 188, 512.1, 767; 96/108, 214, 216; 95/260, 261, 241
See application file for complete search history.

(56) References Cited

U.S. PATENT DOCUMENTS

| 5,503,944 | A | 4/1996 | Meyer et al. |
|---|---|---|---|
| 6,387,558 | B1 | 5/2002 | Mizuno et al. |
| 6,485,854 | B1 | 11/2002 | Grover et al. |
| 6,541,141 | B1 | 4/2003 | Frank et al. |
| 6,579,637 | B1 | 6/2003 | Savage et al. |
| 2003/0019363 | A1 | 1/2003 | Grover et al. |
| 2003/0232228 | A1* | 12/2003 | Grasso ........................ 95/260 |

\* cited by examiner

*Primary Examiner*—David A. Reifsnyder
(74) *Attorney, Agent, or Firm*—Theodore U. Ro

(57) ABSTRACT

A self-regulated water separator provides centrifugal separation of fuel cell product water from oxidant gas. The system uses the flow energy of the fuel cell's two-phase water and oxidant flow stream and a regulated ejector or other reactant circulation pump providing the two-phase fluid flow. The system further uses a means of controlling the water outlet flow rate away from the water separator that uses both the ejector's or reactant pump's supply pressure and a compressibility sensor to provide overall control of separated water flow either back to the separator or away from the separator.

17 Claims, 2 Drawing Sheets

WATER OUTLET CONTROL MECHANISM FOR FUEL CELL SYSTEM OPERATION IN VARIABLE GRAVITY ENVIRONMENTS

ORIGIN OF THE INVENTION

The invention described herein was made by employees of the United States Government and may be manufactured and used by or for the Government of the United States of America for governmental purposes without the payment of any royalties thereon or therefor.

FIELD OF THE INVENTION

The present invention relates generally to the field of proton exchange membrane fuel cell power systems, and, more particularly, to a self-regulating system for managing water in a fuel cell system under conditions of zero gravity, multiples of the earth's gravity, and conditions in between these extremes.

BACKGROUND OF THE INVENTION

Proton exchange membrane fuel cell power plants are known in the art and have shown great promise as an energy source for the future. The use of such fuel cells has become increasingly important for space flight, both manned and unmanned, to supply power over extended periods of time without the need for often unreliable sources of energy such as solar cells. It is also expected that such fuel cell systems will soon find broad application to terrestrial systems, as well.

In application of fuel cell systems to space flight, a problem exists with the separation of fuel cell product water from circulating oxidant gas in variable gravity conditions. In addition, solutions to this problem must use a minimum of power while providing for safe, reliable, and maintenance-free operation of the device for dealing with product water.

A number of water separators have been suggested in the art for fuel cell systems under normal gravity conditions. Such systems have included motor-driven centrifugal separators, including vortex-type separators; gravity fed separators; certain wicking schemes; bubble-point pressure control for water outlet flow control; and hydrophilic/hydrophobic permeable membrane geometries to accomplish product water separation from a circulating reactant gas stream. However, these known systems either require too much power, are unreliable, are difficult to maintain, or exhibit all of these drawbacks. Further, water separator systems specifically designed for operation on the surface of the earth may not operate efficiently, or even at all, when confronted with conditions of varying gravity.

For example, as described in U.S. Pat. No. 5,503,944 to Meyer et al., a known problem in the operation of solid polymer, or proton exchange membrane, fuel cells relates to the management of water, both coolant and product water in the cells of the power plant. In a proton exchange membrane fuel cell, product water is formed by the electrochemical reaction at the membrane on the cathode side of the cells by the combination there of hydrogen and oxygen ions. The product water must be drawn away from the cathode side of the cells. However, makeup water must be provided to the anode side of the cells in amounts sufficient to prevent dry out while avoiding flooding of the anode side of the electrolyte membrane.

To address this need in the art, the system shown and described in the Meyer et al. '944 patent uses porous plates physically close to the cathode reaction sites of a fuel cell, whereby the product water produced at the cathode reaction sites travels through the porous plates to the coolant water stream. This transfer is caused by a pressure differential maintained between the oxygen and the coolant water streams. Excess water is removed from the coolant water stream. Control of water from the cathode reaction sites to coolant water passages is accomplished with the use of the "bubble-point" pressure of the porous plates. However, there is no active control of water outlet flow rates, and the use of bubble-point pressures and porous plates is affected by the thickness of the plate, as is the structural capability of the plates. This particular design solution is also difficult to configure initially when filling all the pores of all the plates uniformly with water. Furthermore, it is difficult to recover from a "blow through" condition, which is loss of the water seal in the porous plates due to exceeding the bubble point pressure.

U.S. Pat. No. 6,579,637 to Savage et al. purports to provide a fuel cell system having a compact, efficient, low-pressure-drop water separator for removing liquid water droplets from water-laden system streams. Water separators are necessary at several points within this system. The system described provides a swirling feature that provides for centrifugal separation of water droplets with the use of fixed swirl vanes. The separated water is then driven by the general fluid flow toward a gravity-dependent, float-switch-controlled water outlet valve. Such a system could not function in an application in which zero gravity and high gravity conditions may be variously encountered.

A water separator for use in an earth-bound vehicle is shown and described in U.S. Pat. No. 6,485,854 to Grover et al. The separator includes a variable flow restriction device to be used as an oxygen and water separator. The variable flow restriction is intended to be adjusted to match the water separation needs of the fuel cell system in which it would be used. As with previously described systems, this system relies on gravity for functions of the system, and thus is inappropriate for variable gravity applications.

Thus, there remains a need for a simple, reliable, energy efficient water separator for use in a fuel cell system which must operate in zero gravity or multi-G conditions. The present invention addresses this need in the art.

SUMMARY OF THE INVENTION

The present invention provides a self-regulated water separator with centrifugal separation of fuel cell product water from oxidant gas. The system uses the flow energy of the fuel cell's two-phase water and oxidant flow stream and a regulated ejector providing the two-phase fluid flow. The system further uses a means of controlling the water outlet flow rate away from the water separator that uses both the ejector's supply pressure and a compressibility sensor to provide overall control of separated water flow either back to the separator or away from the separator.

An externally sensing forward pressure regulator is used to supply a variable pressure reactant gas source to an ejector reactant pump. Supply pressure is dependent on consumption flow. The ejector supply pressure is used to control the speed of a set of constant displacement pumps. The speed of the constant displacement pumps is controlled to provide slightly more volumetric flow of incompressible water away from the water separator than that being produced by the fuel cell.

A second control is based on the compressibility of the water/gas outlet stream. As the separator is emptied of liquid water at a particular operating point (based primarily on rate of energy production), the compressibility of the pumped stream increases. At a minimum compressibility, the reciprocating pump diverts its flow back to the separator, thereby adding additional recycled water back to the separator. A turbine-like device provides a rotating centrifugal separator function without the need for electric motors. The turbine is driven primarily by the circulating oxidant gas stream. The in-separator water inventory is maintained sufficiently low to allow for start up and low reactant flow conditions in non-zero-gravity environments. The fuel flow stream may be used as an auxiliary oxidant/water circulation pump source for low power operation.

These and other features and advantages of this invention will be readily apparent to those skilled in the art.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

DETAILED DESCRIPTION OF A PREFERRED EMBODIMENT

Figure 1:
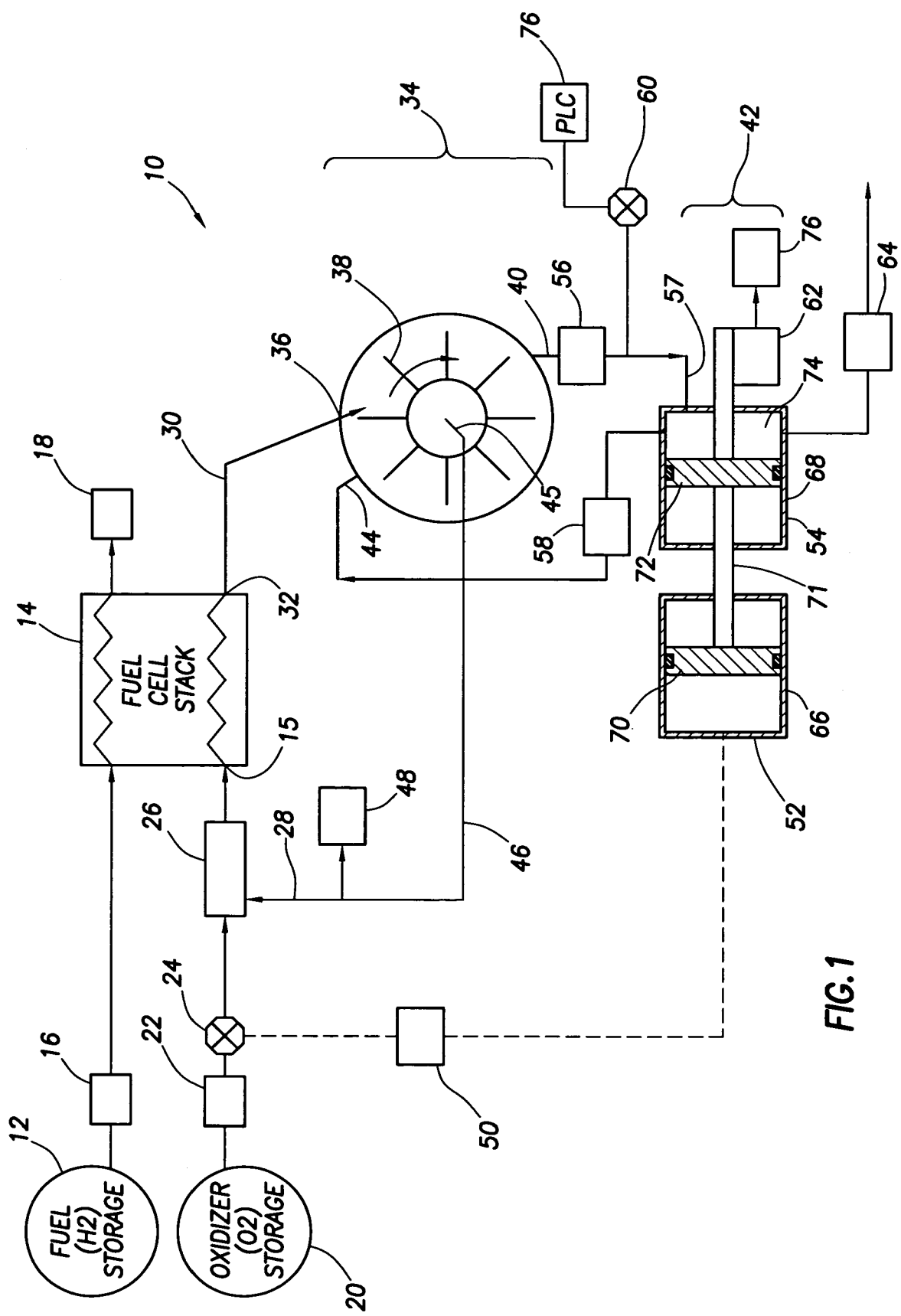
FIG. 1 is a simplified schematic drawing of the fuel cell water control system of the present invention.

FIG. 1 depicts a basic schematic of water control system 10 of the present invention. The system 10 includes a hydrogen fuel storage vessel 12 for the storage of hydrogen at a pressure greater than the pressure required, or otherwise made available, for operation of a fuel cell stack 14. The flow rate of hydrogen fuel from the storage vessel 12 to the fuel cell stack 14 is controlled by a hydrogen pressure regulator/flow controller 16. The controller 16 is capable of controlling the flow rate of hydrogen into the fuel cell stack in order to maintain pressure or to meet consumption flow requirements.

The fuel cell stack 14 comprises a set of one or more fuel cells connected mechanically to provide for containment and distribution of fuel and oxidant gasses within the stack. A typical stack contains a set of bipolar separator plates and membrane electrode assemblies that alternate within the stack. These separator plates may be configured with through holes located commonly on the plates so that when the plates are stacked, they form manifolds for the entire stack. The bipolar separator plates are also typically configured with smaller passageways that provide for the fluid connection of the larger-diameter manifolds with the active area section of the plates. By proper configuration of the manifold holes, flow distribution passageways, flow distribution geometry in the fuel cell active areas, and membrane electrode assemblies, the fuel cell stack provides for several capabilities.

For example, the stack configuration provides for the inlet of fuel and oxidant gasses into inlet manifolds as well as uniform distribution of these gasses into the several fuel cells in the stack. Fuel and oxidant gasses are mechanically separated to preclude direct mixing while providing for electrochemical reactions to occur, whereby hydrogen and oxygen are combined to form water with an electrical potential developed and useful electrical current available in direct proportion to the consumption of fuel and oxidant gasses, and formation of product water. The stack configuration also provides for uniform distribution of fuel, oxidant, and product water from the several fuel cells of the stack into the exit manifolds, and controls exit manifold flow rates in order to provide for inert gas removal, internal stack operating pressure, fuel and oxidant gas humidification, and product water removal from the reaction sites of the fuel cells.

In addition to these features of the fuel cell stack 14, additional components may be provided to produce a capable and useful fuel cell stack. These additional components include: stack pressure end plates; cooling passages within the stack for removal of excess waste heat; tie-rods for mechanically compressing the stack; seals for controlling both internal and external leak rates; and instrumentation and power connection points.

The flow rate of hydrogen fuel exiting the stack 14 is controlled by a hydrogen purge flow controller 18. This device may also control inert gasses (such as helium or nitrogen) in order to provide for long term storage of the fuel cell stack in a non-operational state, or for hazards control. In conventional systems in the art, this function is typically provided by a simple On/Off valve, unlike the control provided by the present invention.

The system 10 is also provided with an oxygen storage vessel 20, where oxygen is stored at a pressure greater than the pressure required, or otherwise made available, for operation of the fuel cell stack. Flow of oxygen from the storage vessel 20 is controlled by an oxygen pressure regulator/flow controller 22. The regulator/controller 22 controls the flow rate of oxygen into the fuel cell stack in order to maintain pressure or to meet consumption flow requirements, in a manner similar to the regulator/controller 16 for hydrogen.

The consumption rate of the oxidant is determined by a feedback device 24. The feedback device 24 may comprise a flow meter; a volumetric flow meter; an ejector supply pressure transducer; a circulation pump control or feedback transducer; a current meter; or other appropriate measuring element that indicates oxygen flow rate from the regulator/controller 22. The feedback device 24 feeds into an oxidant circulation pump 26, which is capable of circulating excess oxidant gas and entrained water vapor from an inlet line 28, described below. The discharge of the circulation pump 26 feeds into an inlet port 15 and into the fuel cell stack 14 wherein the reaction occurs, developing electrical power as well as water as a result of the reaction.

The product water from the stack, as well as unreacted oxygen, exits the stack 14 through a discharge line 30. The line 30 comprises tubing or other means of conveying the excess oxidant gas and entrained product water from a fuel cell stack outlet port 32 to the first stage section of a water separator 34. The first stage section is preferably configured with a cylindrical interior geometry. A turbine section within the cylinder of this section slings product water to the inside surface of the device and positions it at the inside circular surfaces so that it is available to the second stage of the separator.

The first stage section includes an inlet port 36 which is preferably oriented so that inlet flow of fluids tends to enhance the circular motion of a turbine section 38 and provides for early placement of the product water at the internal circular portion of the first stage section. The first stage section further includes a turbine assembly to provide for centrifugal separation of the liquid product water from the excess oxidant gas stream. The turbine is driven primarily by the excess oxidant flow, but may be operationally enhanced with an electric motor drive, or with other means of providing for rotational motion of the turbine.

Product water exits the first stage section at an outlet port 40 to a second stage of the separator. The position of the port 40 is chosen to properly accommodate the use of the separator in gravity or acceleration environments in order to prevent introduction of liquid product water to the oxygen circulation pump 26 or fuel cell stack oxygen inlet port 15. If desired, a plurality of such ports 40 may be used. The fluid collected in the first stage section is discharged for further processing in a second stage section 42. However, at this point it should be noted that compressible fluid flows into the first stage section 34 from the second stage section 42 by way of a return inlet port 44, as described below. As with the inlet port 36, the inlet port 44 is preferably oriented so that the inlet flow of fluids tends to enhance the circular motion of the turbine section 38 and provides early placement of the product water at the internal circular portion of the first stage section.

As previously described, product water exits the first stage section at an outlet port 40. Unreacted oxygen, with water vapor entrained therein, exits the first stage section 34 at a discharge port 45 along the central axis of the turbine element 38. The moist oxygen then travels along a line 46 where it recirculates to the oxygen pump 26. The line 46 may comprise tubing or other means of conveying the excess oxidant gas and entrained water vapor from the water separator first stage gas outlet to the inlet of the oxygen circulation pump.

The outlet flow of oxidant gas from the first stage section 34 is controlled by an oxygen purge flow controller 48. The controller 48, typically a fully open/fully shut valve, may also control inert gasses (such as helium and nitrogen).

The system 10 further provides a water separator second stage compressibility checker operating speed/frequency controller 50. The controller 50 interfaces a feedback signal from the feedback device 24 to an output control function so that a compressibility checker in the section 42 draws more volume of flow from the first stage section 34 to the second stage section 42 than the fuel cell stack 14 would actually be expected to produce. The controller 50 may preferably comprise a pneumatic oscillator whose frequency is dependent on inlet supply pressure, an electric motor driven oscillator, or other appropriate means.

The compressibility checker comprises a driving section 52 and a driven section 54. The driving section 52 may preferably comprise a pneumatic cylinder 66 with a diameter equal to or greater than the diameter of a corresponding cylinder 68 in the driven section 54. The driving section 52 includes a piston 70 and the driven section includes a piston 72, coupled together with a drive shaft 71. If a larger diameter is used in the driving section than in the driven section; a pressure multiplying capability is thereby provided. The exact dimensions of this section, such as diameter, stroke, initial and final volumes, are selected to maximize the efficient use of pressurant gas. Similarly, the driven section 54 preferably comprises a pneumatic cylinder with a diameter equal to, or less than, the driving section. The maximum dimensions of the section 54 are determined by the expected maximum fuel cell water production rate and the desired maximum deliverable outlet pressure of the product water exiting the fuel cell system.

The rate of flow of liquid product water from the first stage section 34 to the second stage section 42 is controlled by an interstage flow control valve 56. The control valve 56 may preferably comprise a two-way or one-way fluid control device. In the basic embodiment shown in FIG. 1, the device is a two-way, solenoid-operated valve, but in the preferred embodiment, shown and described below in greater detail, the device is a one-way check valve, allowing fluid flow only from the first stage section 34 to second stage section 42. The discharge of the interstage flow control valve 56 flows into the section stage section through a flow line 57.

The system 10 further provides a compressible fluid return flow control valve 58. The control valve 58 is preferably a two-way fluid control device. In the embodiment shown in FIG. 1, the device is a two-way solenoid-operated valve, but in the preferred embodiment, shown and described below in greater detail, the device function is provided with a three-way valve, controlled from a set of compressibility-checking diaphragm actuators, described below. The use of the three-way valve in the preferred embodiment allows flow to return to the first stage of the separator or to be expelled from the second stage, but not both.

The pressure in the driven section 54 is sensed by compressibility checker pressure transducer 60. Also, the position of the driven section relative to its total design stroke is provided by a position detector and transducer 62. Finally, control of the flow of incompressible fluids from the water separator out of the second stage section is provided by a second stage discharge control valve 64, preferably a two-way fluid control device. In the embodiment of FIG. 1, the control valve 64 is a two-way solenoid-operated valve, but in the preferred embodiment, the control function is provided with a three-way valve, controlled from compressibility-checking diaphragm actuators as shown and described below. The use of a three-way valve allows flow to return to the first stage of the separator or to be expelled from the second stage, but not both.

Now that the basis structure of the invention, as shown in FIG. 1, has been described in detail, the operation of the system 10 will be more meaningful to those skilled in the art.

Description of Operation of the Basic Embodiment

The operation of the system 10 begins with the reaction of oxygen and hydrogen in the fuel cell stack 14. In a sense, hydrogen is the fuel and oxygen is the oxidizer. Excess oxygen flow is provided in order to sweep out the reaction product water from the fuel cell stack. The fuel cell stack is provided with a supply of hydrogen from the tank 12 and oxygen from the tank 20 under the control of controllers 16 and 22, respectively. The oxygen, in addition to passing through the controller 22, passes through the feedback device 24 and the circulation pump 26 before entering the fuel cell stack 14. The fuel cell stack consumes hydrogen and oxygen at a rate proportional to the electric current drawn by external loads (not shown) electrically coupled to the fuel cell stack. The reaction of hydrogen and oxygen develops product water within the fuel cell stack, which the present invention processes.

Product water is entrained within the excess oxygen flow which is provided by the pump 26. The product water passes from the fuel cell stack 14 to the first stage section 34 at the inlet port 36. Within the first stage section 34, centrifugal action moves the liquid phase water with excess oxygen entrained therein to the inside surface of the cylindrical rotating element, while gaseous oxygen with vapor moves to the center where it exits the first stage section and recirculates to the suction of the recirculating pump 26. The liquid product water exits the first stage section at the outlet port 40 and is directed to the second stage section 42.

The second stage section operates under the control of the rate of oxygen consumption as determined by the feedback device 24 processed through the controller 50. Initially, the driven section cylinder 68 is filled with gaseous oxygen, and the pistons 70 and 72 are positioned to the left, as seen in FIG. 1. As the piston 70 in the driving section 52 moves to the right, compressible fluid within the cylinder 68 in the driven section 54 to the right of the piston 72 is compressed, i.e. pressurized. At the beginning of the cycle, the flow control valves 56, 58, and 64 are closed. So, movement of the piston 72 to the right increases the pressure within a chamber 74 of the cylinder 68. Depending on the compressibility of the fluid in the chamber 74, the pressure rises at a rate relative to the position of the piston 72 and indicated by the position detector and transducer 62.

The pressure rise in the chamber 74 is sensed by pressure transducer 60. In the case of oxygen gas filling the chamber 74, the pressure will rise relatively slowly with continued motion of the driven portion. A programmable logic controller 76 receives signals from the pressure transducer 60 and the detector and transducer 62 to determine which one of the two control valves 58 or 64 to open. In this simple case with oxygen as the initial fluid in the chamber 74, the detector and transducer 62 indicates a minimum travel the right for the piston 72 before the transducer 60 indicates a minimum pressure.

The remainder of the stroke of the piston 72 to the right will then force fluid back through the open control valve 58 into the inlet port 44 into the first stage. At end of the stroke, control valves 58 and 64 are commanded shut and the control valve 56 is commanded open. The driving section piston 70 is then stroked to return the driven section to its initial position to the left as shown in FIG. 1. As this movement occurs, fluid is drawn from the first stage section through the control valve 56 into the chamber 74 due to the increasing volume and decreasing pressure in the chamber 74. At the completion of this return stroke, the control valve 56 is commanded shut. Thus, after the initial stage just described with the second stage flooded with oxygen, it may be seen that centrifugal action moves product water to the discharge port 40. Also, a tendency is developed to draw liquid product water rather than oxygen gas or entrained water vapor into the chamber 74.

For the start of the next cycle, it is assumed that a quantity of liquid product water is drawn into the chamber 74 during the return stroke described above. Under the control of the controller 50, the piston 70 begins to move to the right and the cycle repeats itself as described above. Because a quantity of liquid product water was drawn in from the previous return stroke, the pressure rises faster during the pressure-increasing stroke of piston 72 moving to the right. Depending on the design parameters used to determine the minimum pressure rise required as detected by the transducer 60 before the minimum stroke as indicated by the detector and transducer 62, the control valve 58 or the control valve 64 will be opened. For example, assume that a minimum pressure was not attained before the minimum stroke was obtained with the quantity of water in the chamber 74 for this second cycle. Again, the control valve 58 would be commanded to open and the fluid in the chamber 74 would be returned to the first stage section 34, thereby increasing its liquid product water inventory. Also during this time, the continued operation of the fuel cell stack as described above has continued to increase the liquid product water inventory within the first stage section 34. That inventory tends to be maintained at the discharge port 40 because of the characteristics of the centrifuge separator that tend to position the liquid product water inventory at location within the device.

Eventually, after a number of cycles of the piston 72, the quantity of liquid product water drawn into the chamber 74 will be sufficiently free of oxygen gas that the minimum pressure indicated by the transducer 60 will be reached during the pressure increasing stroke of the piston 72 before the minimum stroke position is indicated by the position detector and transducer 62. The logic controller 76 uses these data to open the discharge valve 64 instead of the control valve 58. At the completion of the full volume decreasing stroke of the piston 72 (full stroke to the right), the quantity of fluid contained within the chamber 74 would be expelled from the chamber as liquid product water meeting a minimum compressibility parameter as determined by the design characteristics of the overall system 10.

Figure 2:
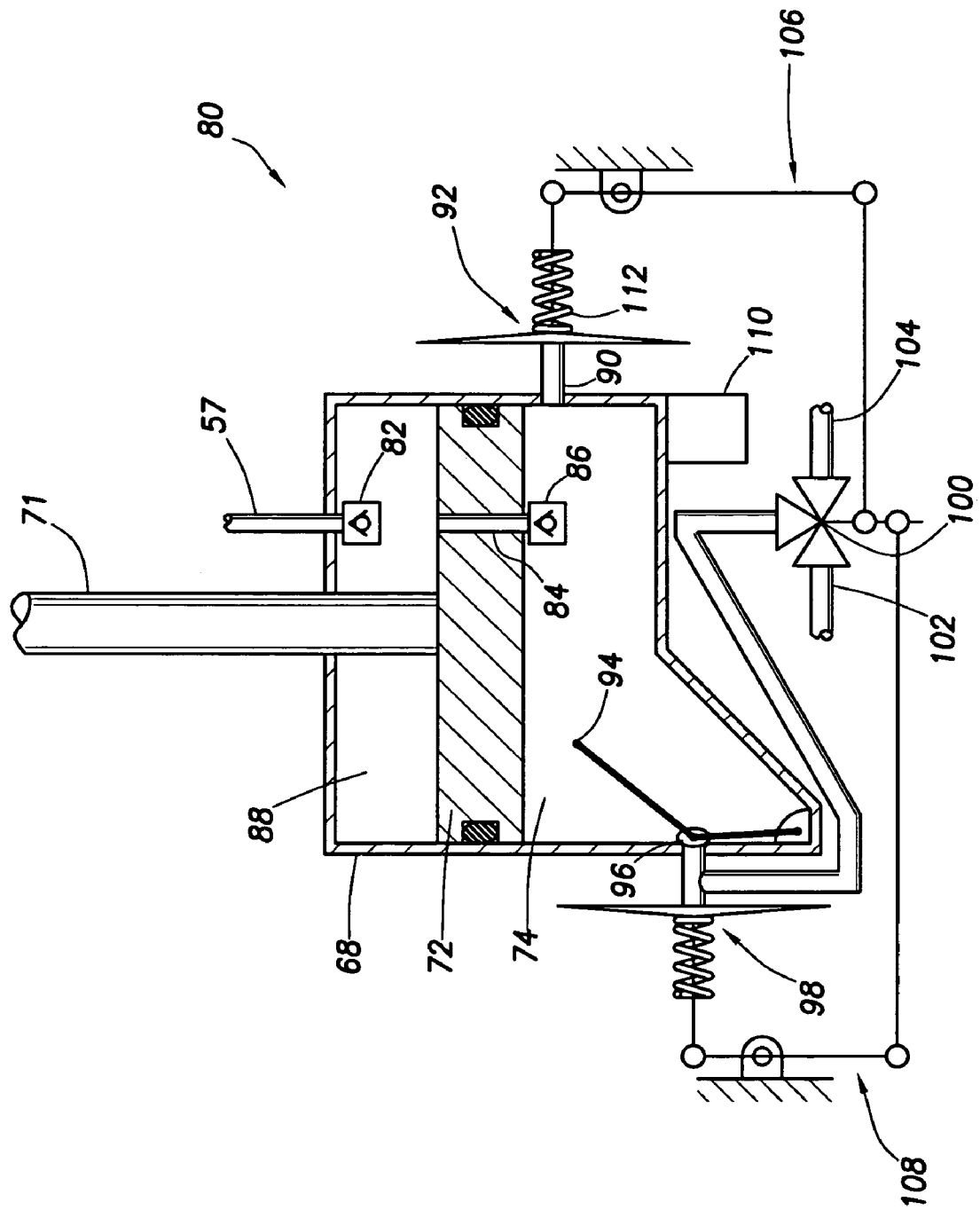
FIG. 2 is a schematic of a detail of the control system of this invention.

The structure and operation so far described has been directed to a simplified embodiment to illustrate the basis of the invention. FIG. 2 illustrates a presently preferred embodiment of the second stage section 80. The second stage section 80 includes the drive shaft 71 from the driving section and is in fluid communication with the first stage section through a flow line 57 (see FIG. 1). The drive shaft 71 joins to or is integrally formed with the piston 72 as previously described. However, in the embodiment illustrated in FIG. 2, the flow line 57 couples to the second stage-section 80 at a check valve 82, shown in FIG. 2 in the shut position. Further, an orifice 84 penetrates the piston 72 and the orifice includes a check valve 86, shown in FIG. 2 in the shut position. The orifice 84 joins an upstream chamber 88 and the chamber 74. The driven piston 72 provides positive displacement movement of fluid from the chamber 88 to the chamber 74, and the check valve 86 provides fluid flow control.

As the piston moves downward, it first encounters a port 90 providing fluid access to a high pressure diaphragm actuator 92. As the piston continues downward, it next encounters an actuator 94 for an outlet valve 96. The outlet valve 96 ports fluid to a low-pressure diaphragm actuator 98 and to a three-way valve 100. An outlet 102 from the three-way valve 100 returns fluid to the first stage of the separator, serving the function of the control valve 58 of the embodiment of FIG. 1. Also, an outlet 104 from the three-way valve 100 provides for exit flow of incompressible liquid from the separator, serving the function of the control valve 64 of the embodiment of FIG. 1. The high-pressure diaphragm actuator 92 couples to the valve 100 through a linkage 106 and the low-pressure diaphragm actuator 98 couples to the valve 100 through a linkage 108. Finally, an accumulator 110 of the embodiment of FIG. 2 allows for over pressure control of a highly incompressible fluid between the actuation of the high-pressure diaphragm actuator 92 and the opening of the position-dependent outlet valve 96. The position dependent outlet valve 96 is actuated and opened by the downward movement of the driven piston 72.

Description of Operation of the Preferred Embodiment

The second stage section 80 of FIG. 2 serves the same basic function as that of FIG. 1, that is to determine the compressibility of the fluid delivered by the first stage section and to carry away the excess, non-compressible fluids developed as a product of the operation of the fuel cell stack.

FIG. 2 above shows the configuration of the preferred embodiment of the second stage section at the beginning of the first cycle. For the first cycle, assume that the chamber 74 is filled with a quantity of both liquid product water and oxidant gas. The overall diameter of the piston 72, total volume captured beneath the piston 72, and the position of port 90 leading to the high pressure diaphragm actuator 92 provide the function of determining the compressibility of the fluid in the chamber 74.

To begin the cycle description, the driven piston 72 moves downward, compressing the fluid volume below it in the chamber 74. Since the fluid is compressible, the piston moves downward, decreasing the captured volume while raising the pressure. By proper choice of the spring rate in the high-pressure diaphragm actuator, the motion of the piston 72 below the port 90 leading to the high pressure actuator will not raise the captured pressure to a level that would overcome a spring 112 in the high-pressure diaphragm actuator. The driven piston 72 continues to move downward past the port 90 leading to the high-pressure diaphragm actuator, effectively preventing further compression in that section. Further downward motion provides for the mechanical opening of the position dependent outlet valve 96 when the piston 72 encounters the actuator 94. As the valve 96 opens mechanically because of the position of the driven piston 72, the low-pressure diaphragm actuator 98 is exposed to the pressure of the captured volume in the chamber 74. The choice of a spring rate in the low pressure diaphragm actuator that is slightly above the fuel cell operating pressure will provide a means of directing the flow of the compressible fluid back to the first stage section through the outlet port 102, actuated with the low-pressure diaphragm actuator.

The driven piston 72 continues to move downward to the limit of its travel at the bottom of the captured volume. The captured fluid has been returned to the first stage section because its compressibility was too high. At this point, the driven piston will begin its upward travel toward the beginning of the next cycle. The pressure captured at the high-pressure diaphragm actuator is reduced to match that of the volume captured above the driven piston, which will be slightly below the system pressure.

The driven piston continues to move upward to the limit of its travel at the bottom of the captured volume. The captured fluid above the driven piston is transferred to the volume below the driven piston through the check valve 86. The position dependent outlet valve 96 is returned to the closed condition as the piston 72 continues its upward movement.

At the beginning of the second cycle, a quantity of fluid is captured that will meet the minimum compressibility of the overall geometric design of the compressibility-checking section. The driven piston 72 moves downward and raises the pressure in the captured volume. As this pressure rises, the high-pressure diaphragm actuator will be exposed to pressures that exceed the minimum to actuate the three-way valve and open the port 104.

The driven piston 72 moves downward and pressure continues to rise in the chamber 74. The small pressure-controlled accumulator 110 allows for over pressure control of the highly incompressible fluid between the actuation of the high-pressure diaphragm actuator and the opening of the position-dependent outlet valve 96.

The driven piston 72 continues to move downward and raise the pressure in the captured volume. As it moves past the port 90 of the high-pressure diaphragm actuator 92, it effectively seals the condition of the actuator and its condition of opening the port 104. The small pressure-controlled accumulator 110 continues to allow for over pressure control of the highly incompressible fluid by accumulating more volume. The driven piston continues to move downward and opens the valve 96. At this point, the low-pressure diaphragm actuator is maintained open by the pressure of the captured fluid. As it moves past the port the high-pressure diaphragm actuator, it effectively seals the condition of the actuator and its condition of opening the port 104. The small pressure-controlled accumulator 110 provides its captured fluid when the pressure lowered below the driven piston by the fluid flow out of the separator through the port 104.

Finally, the driven piston reaches its limit of its travel at the bottom of the captured volume. The captured fluid has exited the separator and fuel cell system through the outlet port 104. At this point, the driven piston begins its upward travel toward the beginning of the next cycle. The high pressure captured at the high-pressure diaphragm actuator is reduced to match that of the volume captured above the driven piston, which will be slightly below the system pressure. The driven piston continues to move upward to the limit of its travel at the bottom of the captured volume. The captured fluid above the driven piston is transferred to the volume below the driven piston through the check valve 86. The position dependent outlet valve 96 is returned to the closed condition as the piston continues its upward movement.

While the foregoing detail description has been directed to proton exchange fuel cells used in power generation systems aboard spacecraft, the present invention is not limited to such systems or to such environments. The device just described may find application to other types of fuel cells, or for that matter, any gas/liquid separation process in spacecraft-like environments. Further, the gas/liquid separation structure and process may also find application in ground based apparatus. For example, chemical and petroleum processing industries and the like would benefit from this type of device.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A system for the control of product water from a fuel cell having a fuel cell inlet and a fuel cell outlet, the system comprising:
   a. a first stage section with an inlet in fluid communication with the fuel cell outlet, the first stage section comprising a centrifugal separator with a fluid outlet along a periphery of the centrifugal separator and a gas outlet along an axis of the centrifugal separator; and
   b. a second stage section in fluid communication with the fluid outlet of the first stage section, the second stage section including:
      i. means for determining the compressibility of fluid received from the first stage section; and
      ii. means for porting fluid from the second stage to either the first stage section or an outlet from the system based on the compressibility of the fluid.

2. The system of claim 1, wherein the centrifugal separator is driven by fluid flow into the first stage section.

3. The system of claim 1, further comprising an interstage flow control valve between the first stage section and the second stage section, the interstage flow control valve adapted to control the rate of liquid fluid flow between the first stage section and the second stage section.

4. The system of claim 1 further comprising:
   a. a pump having a pump suction and a pump discharge, the pump discharge in fluid communication with the fuel cell inlet; and
   b. a recirculation line between the gas outlet of the first stage section and the pump suction.

5. The system of claim 4, further comprising an oxygen purge flow controller on the recirculation line adapted to control the outlet flow of gas from the first stage section.

6. The system of claim 1, wherein the means for determining the compressibility of the fluid received from the first stage section comprises:
   a. a driving section comprising a driving section cylinder and a driving section piston;
   b. a driven section comprising a driven section cylinder and a driven section piston; and
   c. a drive shaft coupling the driving piston and the driven piston.

7. The system of claim 6, further comprising a second stage fluid inlet line into the driven section cylinder, the second stage fluid inlet line in fluid communication with the first stage section.

8. The system of claim 1, further comprising a compressible fluid return flow control valve between the second stage section and the centrifugal separator.

9. The system of claim 1, further comprising a second stage discharge control valve in fluid communication with the second stage section.

10. A method of controlling product water from a fuel cell system, comprising the steps of:
    a. receiving product water and excess oxygen from a fuel cell system into a first stage section;
    b. separating the product water from the excess oxygen in the first stage section;
    c. discharging the separated product water into a second stage section comprising a compressibility checker initially having a quantity of a gas therein;
    d. determining the compressibility of the product water and gas in the compressibility checker; and
    e. discharging liquid product water from the compressibility checker when the compressibility of the product water and gas in the compressibility checker reaches a predetermined threshold.

11. The method of claim 10, further comprising the step of discharging liquid product water from the compressibility checker into the first stage section if the compressibility of the product water and gas in the compressibility checker has not reached the predetermined threshold.

12. A system for the control of product water from a fuel cell having a fuel cell inlet and a fuel cell outlet, the system comprising:
    a. a first stage section with an inlet in fluid communication with the fuel cell outlet, the first stage section comprising a centrifugal separator with a fluid outlet along a periphery of the centrifugal separator and a gas outlet along an axis of the centrifugal separator; and
    b. a second stage section in fluid communication with the fluid outlet of the first stage section, the second stage section including means for determining the compressibility of fluid received from the first stage section.

13. The system of claim 12, wherein the means for determining the compressibility of the fluid received from the first stage comprises:
    a. a driving section comprising a driving section cylinder and a driving section piston;
    b. a driven section comprising a driven section cylinder and a driven section piston; and
    c. a drive shaft coupling the driving piston and the driven piston.

14. The system of claim 13, wherein the driven section further comprises:
    a. an outlet valve from the driven section cylinder;
    b. a three-way valve in fluid communication with the outlet valve;
    c. a high pressure diaphragm actuator in fluid communication with the driven section cylinder to control a first position of the three-way valve; and
    d. a low pressure diaphragm actuator in fluid communication with the outlet valve to control a second position of the three-way valve.

15. The system of claim 13 further comprising a fluid port through the driven section piston.

16. The system of claim 15, further comprising a check valve in the fluid port.

17. The system of claim 12, wherein the centrifugal separator is comprised of a turbine assembly.

* * * * *